United States Patent
Ylitalo et al.

(10) Patent No.: US 7,221,939 B2
(45) Date of Patent: May 22, 2007

(54) SYSTEM, METHOD, AND APPARATUS FOR AUTOMATICALLY SELECTING MOBILE DEVICE PROFILES

(75) Inventors: Tapio Ylitalo, Espoo (FI); Peter Schneider, Helsinki (FI)

(73) Assignee: Nokia Corporation, Espoo (FI)

( * ) Notice: Subject to any disclaimer, the term of this patent is extended or adjusted under 35 U.S.C. 154(b) by 586 days.

(21) Appl. No.: 10/222,188

(22) Filed: Aug. 16, 2002

(65) Prior Publication Data

US 2004/0203768 A1 Oct. 14, 2004

(51) Int. Cl.
*H04Q 7/20* (2006.01)

(52) U.S. Cl. .............. 455/435.1; 455/456.1; 455/456.4; 455/419

(58) Field of Classification Search .......... 455/422.1, 455/435.1, 418, 419, 456.1, 456.2, 456.3, 455/456.4, 456.6, 432.1, 414.1, 567
See application file for complete search history.

(56) References Cited

U.S. PATENT DOCUMENTS

| | | | |
|---|---|---|---|
| 6,694,143 B1 * | 2/2004 | Beamish et al. | 455/456.1 |
| 6,701,144 B2 * | 3/2004 | Kirbas et al. | 455/417 |
| 6,721,542 B1 | 4/2004 | Anttila et al. | |
| 2002/0016169 A1 * | 2/2002 | Sykes et al. | 455/435 |
| 2002/0119788 A1 * | 8/2002 | Parupudi et al. | 455/456 |
| 2003/0119523 A1 * | 6/2003 | Bulthuis | 455/456 |
| 2003/0134626 A1 * | 7/2003 | Himmel et al. | 455/419 |
| 2004/0203644 A1 * | 10/2004 | Anders et al. | 455/414.1 |

FOREIGN PATENT DOCUMENTS

| | | |
|---|---|---|
| WO | WO 98/21911 A1 | 5/1998 |
| WO | WO 00/18166 A1 | 3/2000 |

* cited by examiner

*Primary Examiner*—Temica Beamer
(74) *Attorney, Agent, or Firm*—Hollingsworth & Funk, LLC

(57) ABSTRACT

A system, apparatus, and method for automatically or interactively updating a wireless/mobile device's active settings or profile, based on the location of the mobile device. Profile point identifiers are stored at the mobile device, where each of the stored profile point identifiers is associated with at least one of the profiles available on the mobile device. A profile point identifier that is transmitted over-the-air (OTA) from a corresponding profile point is received at the mobile device when the mobile device is within the transmission range of that profile point. The profile associated with the stored profile point identifier that matches the transmitted profile point is activated in response thereto.

43 Claims, 9 Drawing Sheets

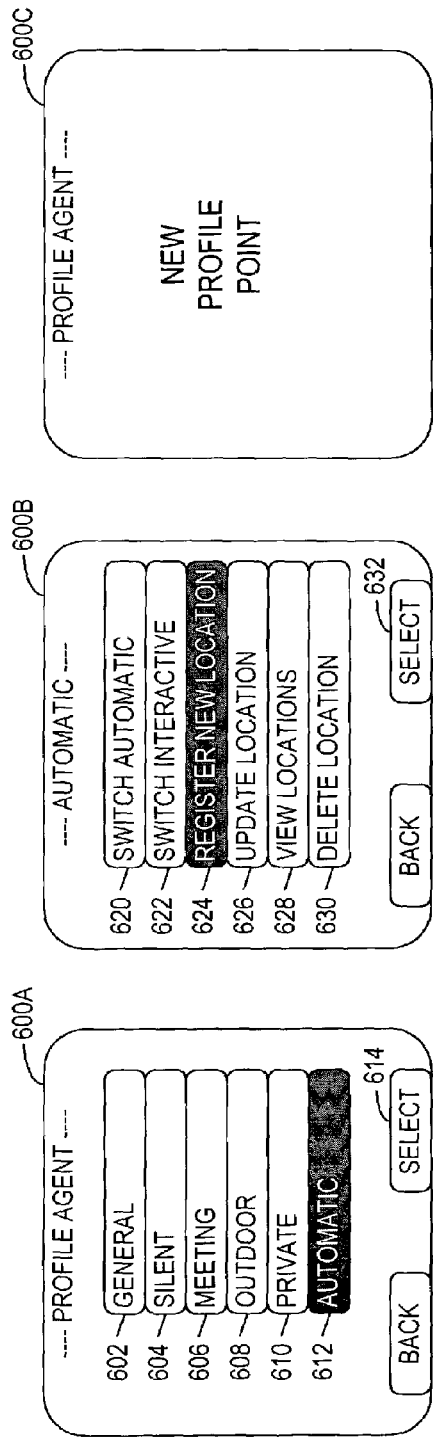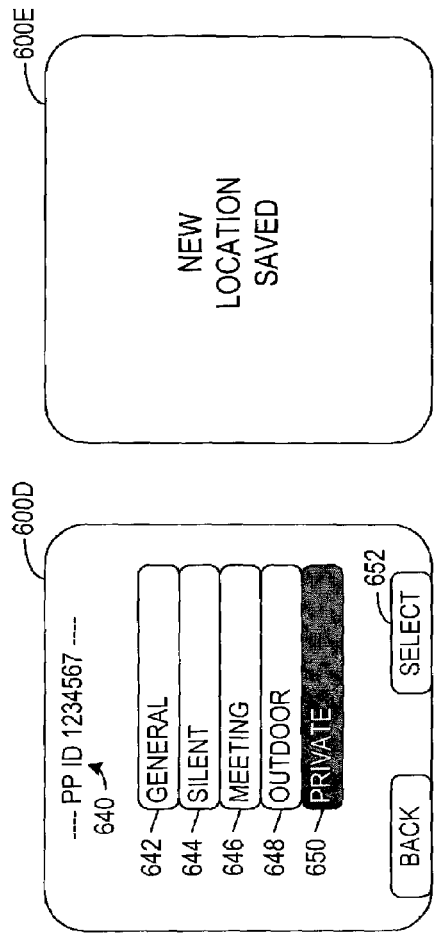
FIG. 6C
FIG. 6E
FIG. 6B
FIG. 6D
FIG. 6A

SYSTEM, METHOD, AND APPARATUS FOR AUTOMATICALLY SELECTING MOBILE DEVICE PROFILES

FIELD OF THE INVENTION

This invention relates in general to mobile communications, and more particularly to a system, method and apparatus for automatically selecting appropriate mobile device profiles based on the location of the mobile device.

BACKGROUND OF THE INVENTION

While mobile telephones were perhaps viewed by many as a luxury when first introduced into the marketplace, they are today viewed by our society as very important, useful, and convenient tools. A large segment of society now carries their mobile devices with them wherever they go. These mobile devices include, for example, mobile telephones, Personal Digital Assistants (PDAs), laptop/notebook computers, and the like. The popularity of these devices and the ability to communicate "wirelessly" has spawned a multitude of new wireless systems, devices, protocols, etc. Consumer demand for advanced wireless functions and capabilities has also fueled a wide range of technological advances in the utility and capabilities of wireless devices. Wireless/mobile devices not only allow voice communication, but also facilitate messaging, multimedia communications, e-mail, Internet browsing, and access to a wide range of wireless applications and services.

With the introduction of these new services also came the ability to configure the mobile device to accommodate the needs or the tastes of the user. For example, mobile devices now often include configurable and/or adjustable features, such as ringing volume, ringing tones, ringing modes (e.g., ring versus vibrate), business or personal call screening/filtering, alert/notification volume or tone, alert/notification visual effects, and a variety of other variable features or settings. Any number of these mobile device settings may be grouped into different "profiles." Thus, a mobile device profile generally refers to any number of settings applied to the mobile device. For example, mobile devices such as wireless telephones typically have configurable and/or adjustable features, such as ringing volume, ringing tones, ringing modes, business or personal call screening/filtering, and so forth. Depending on the particular situation of the mobile device, the mobile device user may want to change those settings. Because the user may be frequently presented with certain situations, it may be desirable to change the settings as a group—i.e., change the profile.

For example, the user may select a particular profile before entering a conference room, where the profile includes turning off an alert or ringing volume, and/or turning on a vibration indicator. In this manner, the user can avoid disrupting a meeting from an incoming call or an audible alert. As another example, a profile may be selected by the user when arriving at home. This profile may filter out business calls, enable personal calls, switch to a more personalized ring tone, etc.

However, the user is burdened with making these profile changes. If the user forgets to switch profiles when the situation changes, the exact event that the profile was intended to avoid will occur. For example, if the user forgets to change the profile when returning home, business calls may ring at home, personal calls may fail to ring, etc. These may be precisely the conditions that the user did not want to occur when at home. As another example, if the user forgets to change the profile before entering a meeting, the desired result of not disrupting the meeting with audible notifications and/or ring tones will occur. This places a burden on the user to continually remember to manually change profiles whenever the user's situation changes. Further, even if the user remembers to make the profile change, the user is burdened with actually having to change the profile at each situation change.

Accordingly, there is a need in the communications industry for a more efficient and convenient manner of selecting the profile to be used at a given location. The present invention fulfills these and other needs, and offers other advantages over the prior art.

SUMMARY OF THE INVENTION

The present invention is directed to a system, apparatus, and method for automatically or interactively updating a wireless/mobile device's active settings or profile, based on the location of the mobile device.

In accordance with one embodiment of the invention, a method is provided for activating profiles on a mobile device. The method includes facilitating storage of profile point identifiers at the mobile device, where each of the stored profile point identifiers is associated with at least one of the profiles available on the mobile device. The profiles represent, for example, a group of one or more mobile device features. A profile point identifier that is transmitted over-the-air (OTA) from a corresponding profile point is received at the mobile device when the mobile device is within the transmission range of that profile point. The profile associated with the stored profile point identifier that matches the transmitted profile point is then activated.

In accordance with more particular embodiments of such a method, the transmitted profile point identifier is compared to the stored profile point identifiers to determine whether the transmitted profile point identifier matches any of the stored profile point identifiers. If a stored profile point identifier matches the received profile point identifier, then the profile that was associated with that stored profile point identifier is the profile that is activated.

In another particular embodiment, the method includes transmitting at least one profile query from the mobile device. The profile query is then received at a profile point, and the profile point transmits the corresponding profile point identifier in response to receiving the profile query. Profile queries may be transmitted in any number of different manners. Predefined query dispatch parameters may dictate how often and/or when the profile queries are transmitted from the mobile device. These parameters may include, for example, a time duration, such that transmitting the profile queries includes periodically transmitting the profile queries upon each expiration of the time duration.

In another particular embodiment, the method may include repeatedly transmitting the profile point identifier from the corresponding profile point. The transmitted profile point identifier is received from the corresponding profile point when the mobile device is within the transmission range of the corresponding profile point. The transmitted profile point identifier is then compared to the stored profile point identifiers to determine whether the transmitted profile point identifier matches any of the stored profile point identifiers.

In another embodiment of the aforementioned method, facilitating storage of the profile point identifiers includes presenting a user interface to allow a user of the mobile device to register one or more of the profile points, associating at least one profile selected by the user of the mobile device with each of the profile points to be registered by the user, and storing the association of the selected profiles and corresponding registered profile points. In still another particular embodiment, the method further includes registering, by the user via the mobile device, one or more of the profile points. This registration includes activating a registration feature via the mobile device when the mobile device is within a transmission range of the profile point to be registered, and selecting the profile to be associated with the registered profile point. In yet another particular embodiment, facilitating storage of profile point identifiers includes providing memory on which the one or more profile point identifiers and associated profiles are pre-stored.

Another particular embodiment of the aforementioned method includes transmitting the profile point identifier OTA from the corresponding profile point via a local positioning technology. Examples of such a local positioning technology include Bluetooth technology and ultrawideband (UWB) radio technology, although any local positioning technology may be employed in connection with the present invention. In addition to using local positioning technologies, other profile point identifiers may be transmitted OTA from its corresponding profile point via a satellite-based positioning system, telecommunications network-based positioning system such as a cellular network, or other non-local positioning technology. In yet another embodiment, the method includes transmitting the profile point identifier OTA from the corresponding profile point directly via a satellite-based positioning system, telecommunications network-based positioning system, or other non-local positioning technology.

In another particular embodiment of this method, the method includes reverting to the predetermined or "default" one of the profiles when an OTA signal from the corresponding profile point falls below a certain signal-level threshold. In another embodiment, the method includes reverting to the predetermined one of the profiles when one or more predetermined location identifiers available to the mobile device indicate a change of location. This can occur when, for example, one or more network-based identifiers provided over a wireless network to the mobile device change, thereby indicating a change of location of the mobile device.

In accordance with another embodiment of the invention, a method is provided for activating profiles on a mobile device based on a location of the mobile device. The method includes storing one or more location identifiers on the mobile device, where the location identifiers correspond to locations in which automatic profile activation is desired. If and when the mobile device is moved to one of the locations in which automatic profile activation is desired, the mobile device receives an OTA-transmitted location identifier corresponding to the location in which the mobile device has been moved. The OTA-transmitted location identifier is compared with the stored location identifiers on the mobile device to identify the stored location identifier matching the OTA-transmitted location identifier. The profile(s) that was pre-assigned to the stored location identifier that matches the OTA-transmitted location identifier is automatically activated in response thereto.

In accordance with more particular embodiments of such a method, the method may include forwarding the OTA-transmitted location identifier from the mobile device to a wireless network in which the mobile device operates therein, for use in other location-based services. In another embodiment, receiving the OTA-transmitted location identifier includes receiving a Bluetooth identifier transmitted via Bluetooth technology, or other local positioning technology.

In accordance with another embodiment of the invention, a mobile device is provided that includes multiple features, and multiple profiles that include groups of one or more of those features. The mobile device includes a memory to store location identifiers, and to store an association between each of the stored location identifiers and one of the plurality of profiles (although "one" of the profiles may be a combination of other profiles). The mobile device includes a receiver to receive location identifiers transmitted OTA from respective profile points. The mobile device further includes a processing system configured to determine whether the received location identifier matches any of the stored location identifiers. If a match exists, the profile associated with the stored location identifier that matches the received location identifier is activated. In this manner, the features associated with the activated profile are placed into effect.

In more particular embodiments of such a mobile device, a transmitter is provided to transmit profile point queries to search for the profile points. The receiver thus receives the location identifiers OTA from the respective profile points in response to the respective profile point receiving at least one of the profile point queries. In another particular embodiment, the memory also stores a profile agent, and the processing system executes the profile agent to determine whether the received location identifier matches any of the stored location identifiers, and to activate the profile associated with the stored location identifier that matches the received location identifier. In yet another particular embodiment of such a mobile device, a user interface is provided to facilitate registration of profile points, where the processing system is further configured to store the location identifiers resulting from the registration of the profile points into the memory.

In accordance with another embodiment of the invention, a system for activating profiles on a mobile device based on a location of the mobile device is provided. The system includes one or more profile points positioned at different locations in which automatic profile activation is desired, where each of the profile points is associated with a profile point identifier that is transmitted OTA from the respective profile point. The system further includes a mobile device having multiple features, and having multiple profiles each associated with one or more of the features. The mobile device includes a memory to store one or more profile point identifiers, and to store an association between each of the stored profile point identifiers and one of the profiles. The mobile device includes a receiver to receive the profile point identifier transmitted from a respective one of the profile points when the mobile device is within a transmission range of the respective one of the profile points. The mobile device further includes a processing system configured to determine whether the received profile point identifier matches any of the stored profile point identifiers, and to activate the profile associated with the stored profile point identifier that matches the received profile point identifier.

In accordance with more particular embodiments of such a system, the mobile device further includes a transmitter to transmit profile point queries to search for the profile points, where the receiver receives the profile point identifiers OTA from the respective profile points in response to the respective profile point receiving at least one of the profile point queries. One embodiment of a profile point includes a profile point receiver to receive the profile point queries when the profile point queries are perceivable at the profile point, and a transmitter to transmit the respective profile point identifier OTA in response. In a more particular embodiment of such a profile point, the profile point includes a wake-up circuit to receive the transmitted profile point queries and to exit a stand-by mode in response thereto. Such a profile point may also include a profile point receiver to receive the profile point queries when the stand-by mode has been exited, and a transmitter to transmit the respective profile point identifier OTA.

The above summary of the present invention is not intended to describe each illustrated embodiment or implementation of the present invention. This is the purpose of the figures and the associated discussion which follows.

BRIEF DESCRIPTION OF THE DRAWINGS

The invention is described in connection with the embodiments illustrated in the following diagrams.

FIG. 6, including FIGS. 6A–6E, illustrates an example of a representative registration process effected via a representative user interface;

DETAILED DESCRIPTION OF THE INVENTION

Figure 1:
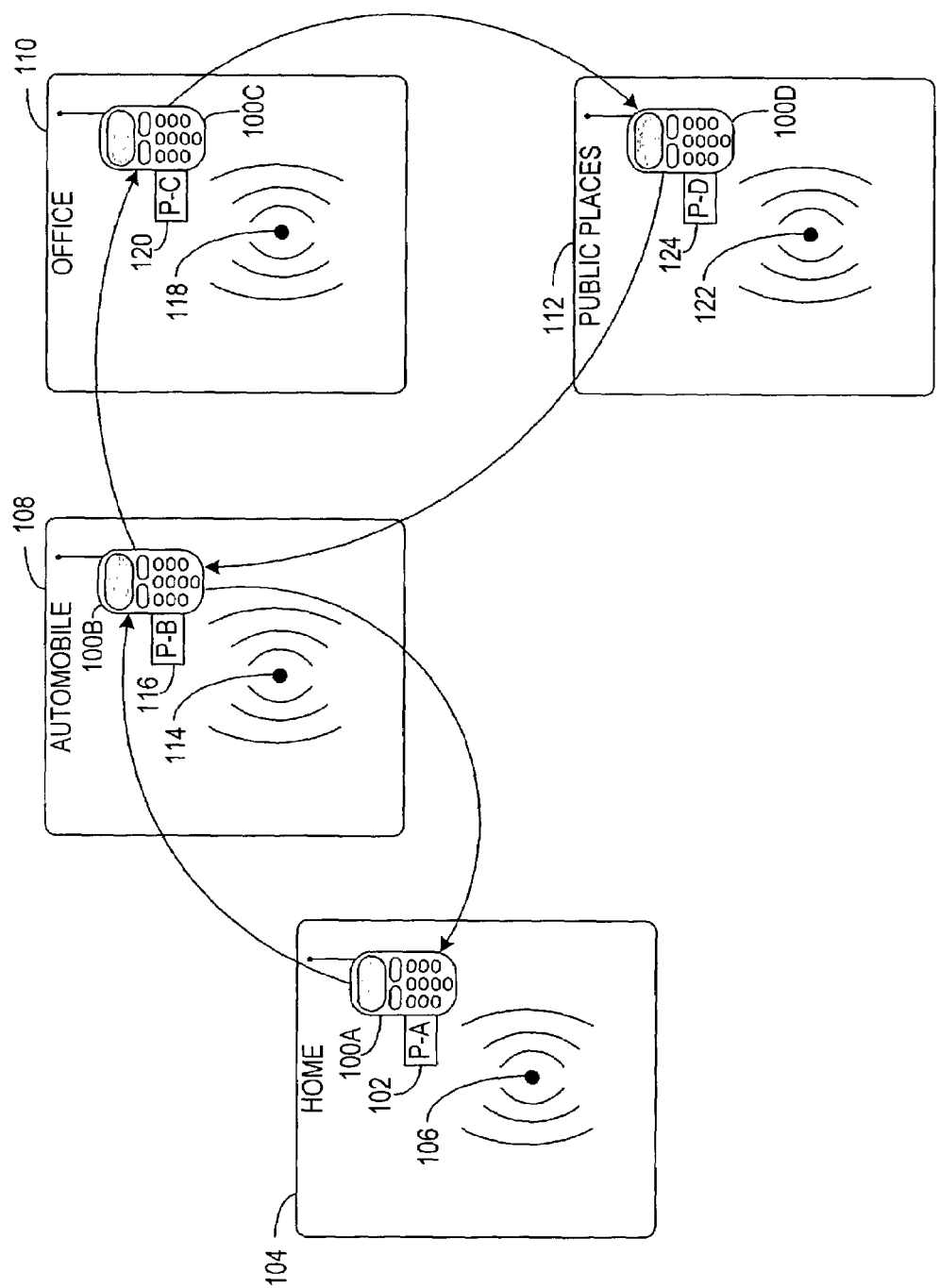
FIG. 1 is a diagram illustrating an example of the automatic profile selection in accordance with the present invention.

In the following description of the exemplary embodiment, reference is made to the accompanying drawings which form a part hereof, and in which is shown by way of illustration the specific embodiment in which the invention may be practiced. It is to be understood that other embodiments may be utilized, as structural and operational changes may be made without departing from the scope of the present invention.

Generally, the present invention provides a manner for automatically updating a wireless/mobile device's active settings or "profile" based on the location of the mobile device. A software module (generally referred to herein as a profile agent) available to the mobile device automatically switches between a plurality of profiles depending on the location of the mobile device. One or more profile points are implemented to provide location indications via wireless/over-the-air (OTA) technologies to allow the mobile device to determine which profile area the mobile device is currently within. Based on this location information, the profile agent can automatically (or via reasonably limited user interaction) change the profile to one that is appropriate for the location in which the mobile device is currently operating.

A mobile device "profile" refers to any number of settings applied to mobile devices, and/or agents, applications, or other software operable on mobile devices. For example, mobile devices such as wireless telephones typically have configurable and/or adjustable features, such as ringing volume, ringing tones, ringing modes (e.g., ring versus vibrate), business or personal call screening/filtering, and so forth. Depending on the particular situation or location of the mobile device, the mobile device user may want to change those settings. For example, while in a meeting, the user may want to turn off the mobile device, turn down/off the ringing volume, or change the ringing mode to vibrate rather than produce an audible sound. As another example, the user may want to increase the volume while in a noisy environment, like some outdoor situations, or while driving an automobile, or while listening to a stereo, television, etc. Yet another example is where the user wants to filter certain calls at a given time. The user may want to send non-urgent business calls (e.g., calls from certain business associates) when the user is not at work or is otherwise on personal time. On the other hand, the user may want to filter certain personal calls while at the office. These and a multitude of other situations may cause the user to modify the settings on the mobile device to accommodate those situations.

These settings adjustments can be collectively changed based on the situation by creating "profiles." One profile may be, for example, a private profile for receiving only private calls or those from very important persons while at home or otherwise on personal time. Another profile can be an outdoor profile that increases the ringing volume and/or changes the ringing tone so that it can be better heard outdoors, in an automobile, or in other more noisy environments. In other words, selection of a profile can change one, or multiple mobile device settings to accommodate the particular situation/location in which the mobile device is being used.

While the use of profiles may provide additional efficiency for users, the problem remains that the user is expected to change the profile each time the situation or location changes that would prompt a profile change. The present invention solves this problem, by facilitating automatic profile changes based at least in part on the user's (and consequently the mobile device's) whereabouts.

FIG. 1 is a diagram illustrating a representative environment in which the principles of the present invention may be employed. The example of FIG. 1 depicts a progression of automatic profile selections based on the location of a mobile device. It should be recognized that while only a single mobile device is depicted in FIG. 1 for purposes of explanation, the invention is applicable to a plurality of mobile devices which each employ the principles of the present invention.

The mobile device shown in FIG. 1 is depicted as a mobile telephone, although the following description is applicable to any number of wireless devices. In accordance with the present invention, the mobile telephone profile will be automatically changed when a certain predetermined location is entered, if the device has been set to do so. For example, the mobile phone 100A may be automatically set to a first profile P-A 102 when the mobile phone 100A is located at a first location such as the user's home 104. In accordance with one embodiment of the present invention, the appropriate home 104 profile is automatically selected when the mobile device 100A is within range of a signal generator 106 that transmits information that is used by the mobile device 100A to trigger a profile change to the appropriate profile for use in the home 104. In one embodiment, the signal generator 106, referred to herein as a profile point, is a device that generates a wireless signal recognizable by the mobile device 100A. Any appropriate wireless signal technology may be employed, such as Bluetooth or other local positioning or short-range wireless communication technology. Wider range wireless communication technologies may be used for larger areas where appropriate, including any telecommunication network-based positioning system. This can include, for example, a cellular network itself, whereby a cell-ID, Location Area Code (LAC), or other location identifier can be used to update the mobile device profile.

When the mobile device 100A enters the home 104 and within the range of the profile point 106, the mobile device 100A profile P-A 102 designated for the home 104 is selected. This profile P-A 102 may include, for example, a "private" profile for receiving only private calls or those from very important persons. The private profile could also include a different ring tone or ring volume, or other designated parameter. In this manner, when the mobile device 100A enters the home 104 served by the profile point 106, the profile will be automatically changed to the predefined profile for that location.

In accordance with the invention, the user may identify locations frequently visited by the user, such as the user's home 102, in which a profile point may be utilized. In such a case, the user himself/herself can provide a profile point at the desired location, and configure the mobile device to react to that profile point by changing the current profile upon entering the range of the profile point. The user may also provide profile points in other frequently-visited locations, such as the user's automobile(s) 108, office(s) and/or conference rooms 110, etc.

Furthermore, profile points may be implemented in other establishments or public places 112. For example, a theatre may implement a profile point, so that theatre patrons who frequent that theatre may register a profile for that location. In this manner, each time the user enters the theatre, the user's mobile device will automatically select the appropriate profile to, for example, reduce or turn off the ringing volume, change the ringing mode from a ring tone to a vibration, etc. This could also be used for example, on airlines where wireless device use is prohibited on airplanes at certain times. The user would simply need to register their wireless device so that a particular profile is selected when within the range of the profile point. Profile points can be used in physicians' offices, stores, restaurants, conference centers, etc. As can be seen, a multitude of various potential locations, identified by either the user or establishments, may implement profile points in accordance with the invention.

The automatic selection of the appropriate profile is illustrated using the example shown in FIG. 1. When the user leaves the home 104 and enters his/her automobile 108, the profile point 114 provides a wireless signal recognizable by the mobile device 100B, thereby causing the profile to automatically change to another profile identified as P-B 116. This predefined profile may, for example, increase the volume of the ringing tone to account for the greater noise level present while driving the automobile 108. This profile may also allow both personal and business calls to be received, or may otherwise filter some calls whether they be personal, business, etc.

In the illustrated example, the user may then leave the automobile 108 when arriving at the office 110. One or more other profile points 118 provides a wireless signal recognizable by the mobile device 100C, causing the profile to automatically change to yet another profile identified as P-C 120. Additional profile points may be available in the office environment, such as in conference rooms, a cafeteria, etc. to continually select the appropriate profile for that particular location. The extent of the "location" can be set by the strength, and therefore the range, of the wireless signal generated by the profile point.

The mobile device user may then walk to an establishment 112 (e.g., theatre) after leaving the office 110. Again, a profile point 122 will cause the profile of the user's mobile device 100D to change to a profile P-D 124 suitable for that location. When the user again enters the automobile 108, the profile P-B 116 is again selected, and the profile P-A 102 is again selected when the user returns to home 104. As can be seen, once the mobile device has been registered for the various locations, the mobile device profile continually changes as the user moves from location to location, without requiring the user to manually select new profiles.

In accordance with one embodiment of the invention, the profile agent within the mobile device will not only match the profile point identifier to a particular profile, but will also make use of network location identifiers. For example, in the context of Global System for Mobile Communication (GSM) networks, these network location identifiers may include the current cell identifier (cell-ID) and location area code (LAC). Thus each cell is identified uniquely on the radio channel as belonging to a location area (LA), and each mobile device can determine its current location. The cell-ID and LAC may be used to switch the profile back to a predetermined profile (e.g., a "general" profile, default profile, or other predetermined profile) if the user enters a radio cell area with a new cell-ID and LAC and thus leaves the known location. In this manner, a default profile can be automatically reset when the user has left a particular location associated with a particular cell-ID and LAC.

In another embodiment of the invention, the profile can be automatically reset to a default profile when the user leaves the area covered by the particular profile point. In such an embodiment, the mobile device periodically monitors for the signal generated by the profile point (e.g., monitor for a Bluetooth signal), and when the signal has faded below a predetermined threshold, the default profile would be selected to replace the profile that was selected when in the profile point's range.

The local positioning technology used, such as Bluetooth, UWB radio, etc. provides relatively precise location information, even where the location is indoors. The location determined using such a local positioning technology may optionally be forwarded to the network in which the mobile device operates (e.g., a cellular network), so that this location information may be used in connection with other location-based services available via that network.

Figure 2:
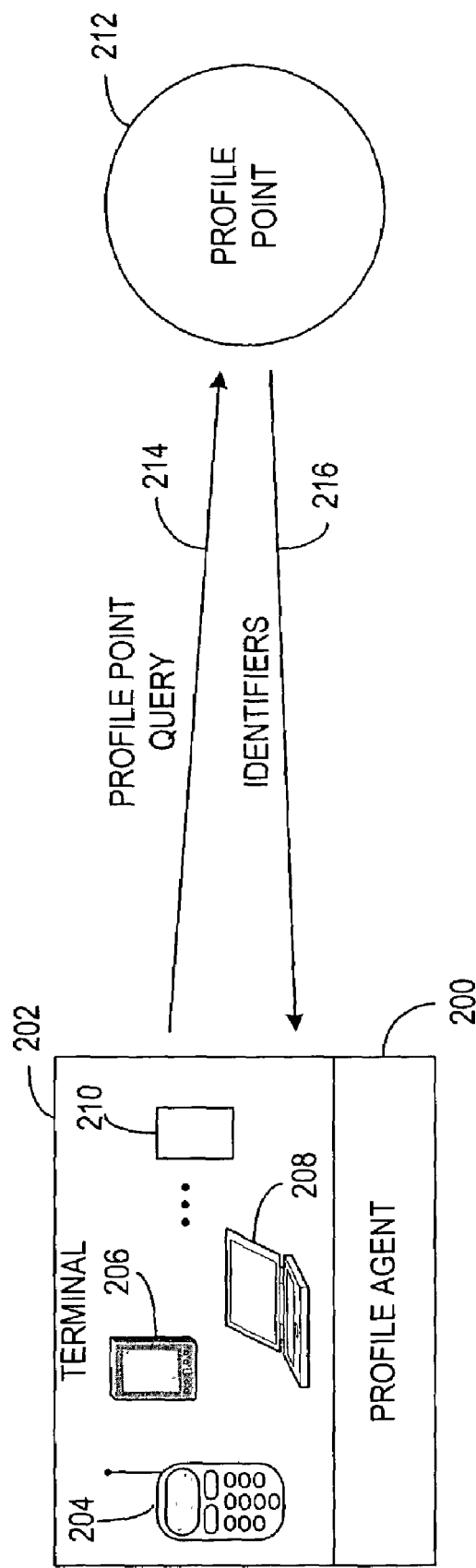
FIG. 2 is an exemplary embodiment of a communication between a profile agent within a mobile device and a profile point in accordance with the present invention.

FIG. 2 is an exemplary embodiment of a communication between a profile agent within a mobile device and a profile point in accordance with the present invention. The illustrated embodiment includes a profile agent 200 associated with a mobile device 202. Such a profile agent 200 may be used with any number of mobile communication devices, such as a mobile/cellular telephone 204, a personal digital assistant (PDA) 206, a notebook or laptop computer 208, or any other type of wireless terminal represented by device 210. In one embodiment of the invention, the profile agent 200 is a software application responsible for searching for profile points, and for switching the profile when a known location is identified. Whether or not the mobile device 202 is within a known location is determined by the mobile device's recognition of a profile point 212 to which the mobile device has been registered (described more fully below).

The profile point 212 provides a manner of notifying the profile agent 200 that the mobile user is in a frequently visited location to which the user has previously registered. In one embodiment of the invention, the profile point 212 implements a local positioning technology, such as Bluetooth. As is known in the art, Bluetooth is a computing and telecommunications industry specification that describes how mobile telephones and other mobile devices can interconnect with each other and with home and business phones/computers using a short-range wireless connection. As will become more evident from the description provided herein, Bluetooth or other similar local positioning technologies are particularly advantageous in connection with the present invention as they are technologies that may be used indoors, where other technologies such as the Global Positioning System (GPS) are of little use indoors. Using a local positioning technology such as Bluetooth, GPS-like accuracy can be provided in indoor environments.

The profile point 212 serves as a device that monitors for profile point queries from mobile devices 202, as represented by the "profile point query" signal depicted on wireless path 214. The profile agent 200 will search for registered Bluetooth profile points by broadcasting the profile point query signal. This searching may be performed substantially periodically, at predetermined times, randomly, upon occurrence of another triggering event, etc. In one embodiment of the invention, the searching occurs substantially periodically. Upon recognition of the query signal from a mobile device 202 that is within range of the Bluetooth profile point 212, the profile point 212 responds with a location identifier that ultimately informs the mobile device 202 which location the mobile device 202 has entered. In one embodiment of the invention, this location identifier is the Bluetooth device identification (ID), illustrated by the "identifiers" on wireless signal path 216.

The profile agent 200 will then check whether the identifier received via wireless signal path 216 has been registered in the profile agent. If registered, the profile agent 200 will ultimately activate a profile that has previously been matched to the profile point 212 Bluetooth device ID during a registration process. Optionally, the profile agent 200 may produce a confirmation indication such as a visual, audible, or other indication on the mobile device 202 that the profile for this location has been selected.

Figure 3:
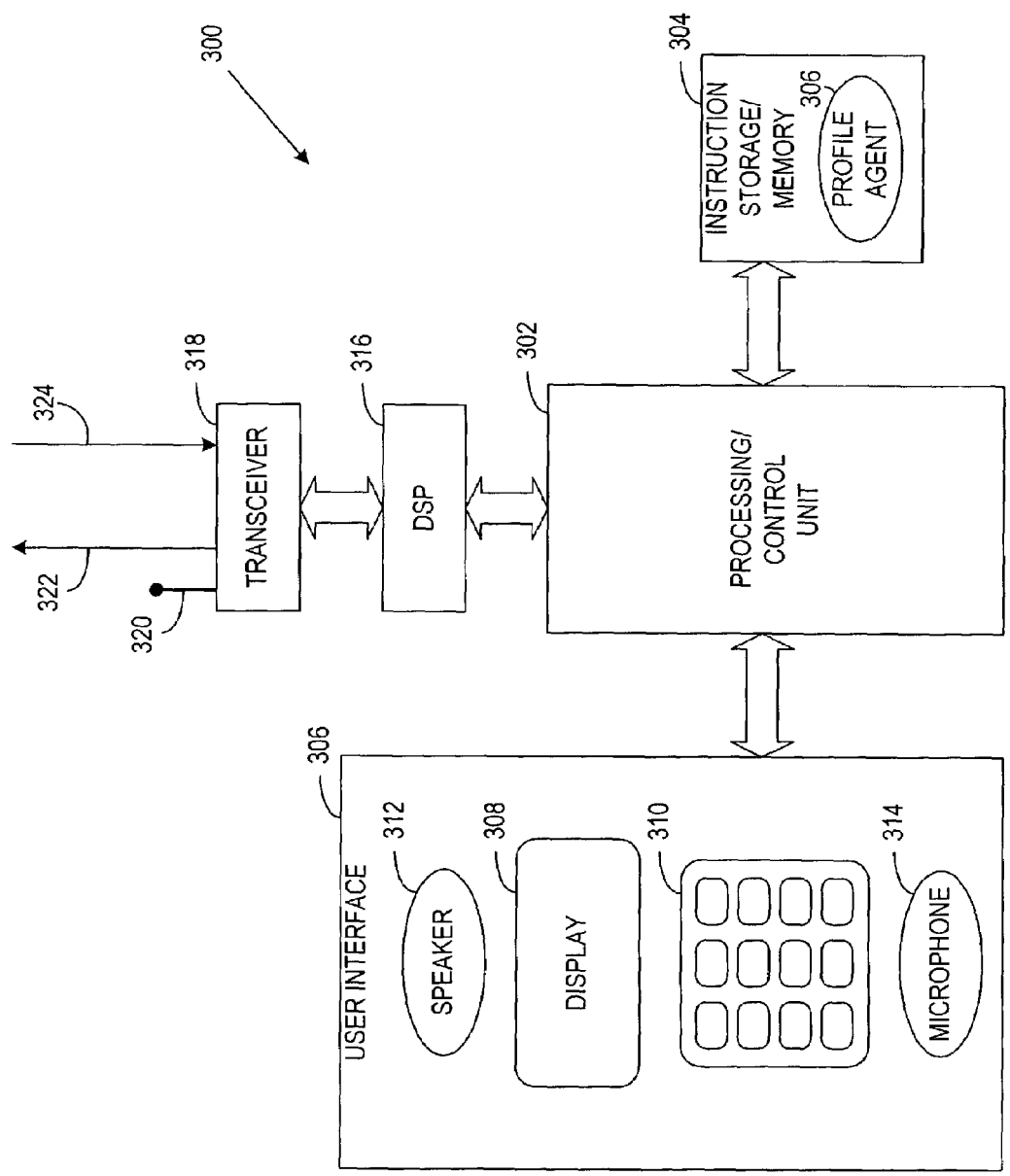
FIG. 3 illustrates an example of a representative mobile device computing system capable of carrying out operations in accordance with the invention.

The mobile devices described in connection with the present invention may be any number of wireless devices incorporating user profile information, such as wireless/cellular telephones, personal digital assistants (PDAs), or other wireless handsets, as well as portable computing devices capable of wireless communication. The mobile devices utilize computing systems to control and manage the conventional device activity as well as the functionality provided by the present invention. Hardware, firmware, software or a combination thereof may be used to perform the various profile agent functions, display presentations, and operations described herein. An example of a representative mobile device computing system capable of carrying out operations in accordance with the invention is illustrated in FIG. 3.

The exemplary mobile computing arrangement 300 suitable for performing the operations in accordance with the present invention includes, for example, a processing/control unit 302, such as a microprocessor, reduced instruction set computer (RISC), or other processing module. The processing unit 302 need not be a single device, and may include one or more processors or circuits. For example, the processing unit may include a master processor and associated slave processors coupled to communicate with the master processor.

The processing unit 302 controls the basic functions of the mobile device as dictated by programs available in the program storage/memory. Thus, the processing unit 302 executes the functions associated with the profile agent of the present invention. More particularly, the program storage/memory 304 may include an operating system and the profile agent 306 for carrying out functions and applications on the mobile device. For example, the program storage 304 may include one or more of read-only memory (ROM), flash ROM, programmable and/or erasable ROM, random access memory (RAM), subscriber interface module (SIM), wireless interface module (WIM), smart card, or other removable memory device, etc. The profile agent may also be transmitted to the mobile computing arrangement 300 via data signals, such as being downloaded electronically via a network or collection of networks, including wireless and landline networks such as the Internet.

The program storage/memory 304 may also be used to store data, such as the various user profiles in accordance with the present invention. In one embodiment of the invention, the user profiles are stored in non-volatile electrically-erasable, programmable ROM (EEPROM), flash ROM, etc. so that the user profiles are not lost upon power down of the mobile device.

The processor 302 is also coupled to user-interface 306 elements associated with the mobile device. The user-interface 306 of the mobile device may include, for example, a display 308 such as a liquid crystal display, a keypad 310, speaker 312, and microphone 314. These and other user-interface components are coupled to the processor 302 as is known in the art. The keypad 310 includes numeric and/or alpha-numeric keys for performing a variety of functions, including dialing numbers and executing operations assigned to one or more keys. For example, in accordance with the present invention, the functions associated with the profile agent may be initiated, registered, etc. via the keypad 310. Alternatively, other user-interface mechanisms may be employed, such as voice commands, switches, touch pad/screen, graphical user interface using a pointing device, trackball, joystick, or any other user interface mechanism.

The mobile computing arrangement 300 may also include a digital signal processor (DSP) 316. The DSP 316 may perform a variety of functions, including analog-to-digital (A/D) conversion, digital-to-analog (D/A) conversion, speech coding/decoding, encryption/decryption, error detection and correction, bit stream translation, filtering, etc. The transceiver 318, generally coupled to an antenna 320, transmits and receives the radio signals associated with the wireless device. For example, the transceiver 318 transmits the "profile point query" signal shown on wireless signal path 322 and shown previously on wireless signal path 214 in FIG. 2. The transceiver 318 also receives identifier responses from profile points via wireless signal path 324, such as previously shown on wireless signal path 216 in FIG. 2. In one embodiment of the invention, the profile agent 306 which is executed by the processing unit 302 generates the query sent via path 322, and processes the responses received via path 324 to effect the profile selection.

The mobile computing arrangement 300 of FIG. 3 is provided as a representative example of a computing environment in which the principles of the present invention may be applied. From the description provided herein, those skilled in the art will appreciate that the present invention is equally applicable in a variety of other currently known and future mobile computing environments. For example, the profile agent in accordance with the present invention may be stored in a variety of manners, may be operable on a variety of processing devices, and may be operable in mobile devices having additional, fewer, or different supporting circuitry and user-interface mechanisms.

Figure 4:
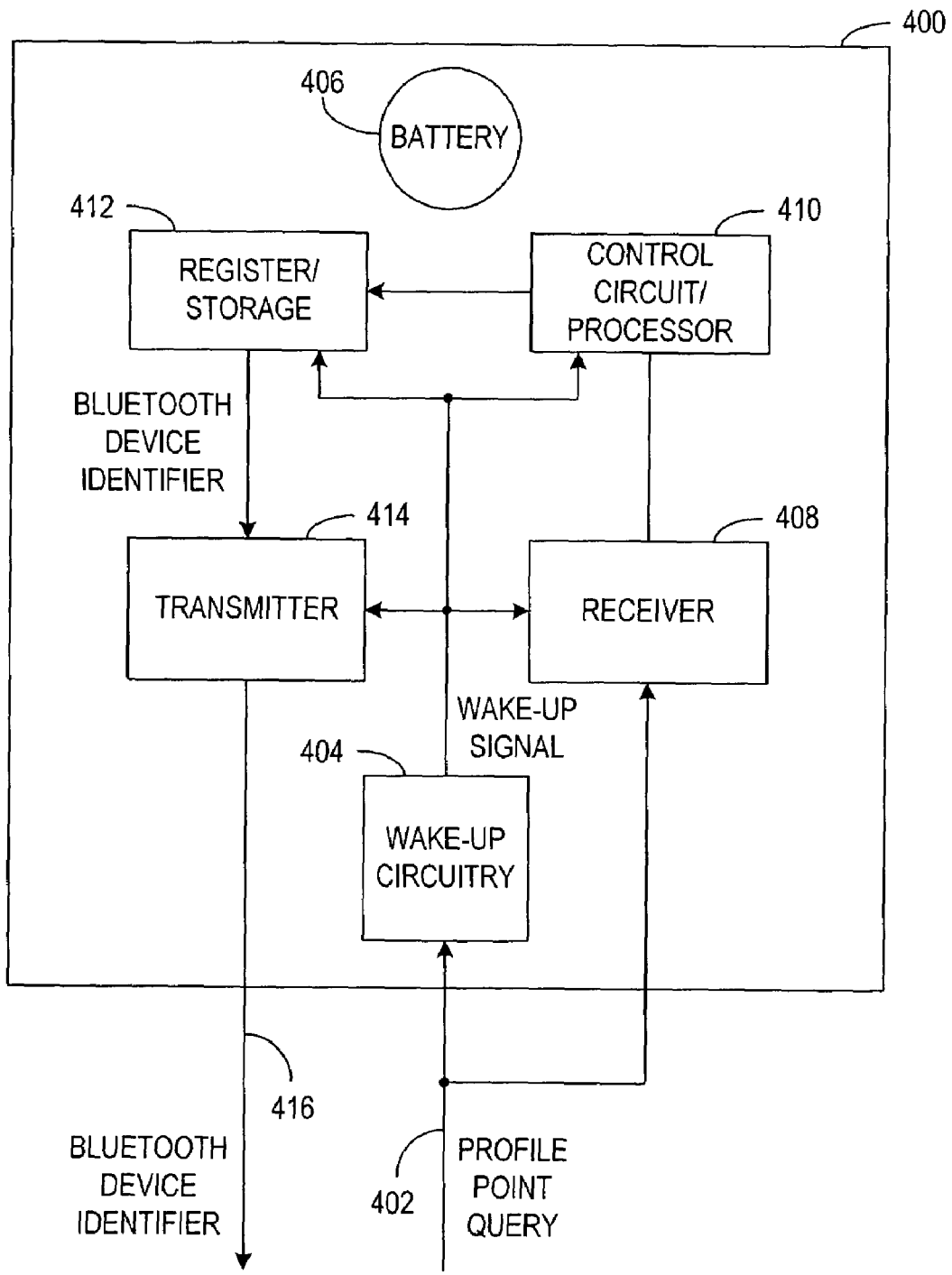
FIG. 4 is a block diagram of an exemplary profile point in accordance with the present invention.

FIG. 4 is a block diagram of an exemplary profile point 400 in accordance with the present invention. The profile point 400 may be implemented in a number of manners, and in one embodiment of the invention is implemented as a small, electronic device having no mechanical moving parts. The profile point housing may be constructed of plastic or any other desired material, depending on the size, purpose, etc. The profile point may be constructed to accommodate individual tastes, by providing a stylistic housing. As to the operative implementation in the representative example of FIG. 4, the profile point 400 receives the profile point query via path 402 at a wake-up circuit 404. Implementation of the wake-up circuit 404 allows the profile point 400 to go into a stand-by mode when no query signals from mobile devices are present, thereby reducing power consumption and preserving battery 406 life (in the case where the profile point 400 is battery-powered). When the wake-up circuit 404 recognizes a profile point query from a mobile device, it activates the profile point circuitry, thereby exiting stand-by mode. It should be recognized that other embodiments of the invention do not utilize a wake-up circuit, and the circuitry within the profile point 400 remains active. However, the use of such a wake-up circuit 404 minimizes the power consumption required. Further, the profile point and the mobile device exchange signals, but do not establish an actual connection therebetween in one embodiment of the invention, thereby further reducing power consumption. It should also be recognized that the profile point can, in still other embodiments, be powered by a wired electrical connection and perhaps an associated transformer (not shown) where the profile point is permanently or removably mounted in a particular location.

The profile point query is received at a receiver 408, which may be a separate receiver component or associated with a transceiver. A processor or dedicated control circuit 410 acts on the query by obtaining the location identifier from a register or other storage 412 associated with the profile point. For example, where the control circuit/processor 410 is a microprocessor or other processing device, the location identifier may be stored in a register of the processor, or may be stored in memory. In another embodiment, the control circuit 410 merely generates an enable signal that activates a memory 412 to output the location identifier. In still another embodiment, the receiver 408 itself can enable the storage 412 to output the location identifier, without the need for a control circuit 410. In yet another embodiment, the receiver can enable the transmitter 414 to output a hard-coded location identifier, thereby obviating the need for either a control circuit 410 or the register/storage 412. As can be seen, a number of different implementations are conceivable in connection with the present invention, and those skilled in the art will readily appreciate that these and other implementations may be used in connection with the invention.

In one embodiment of the invention, the profile point 400 implements Bluetooth technology, or other local positioning technology such as ultrawideband (UWB) radio and others. Furthermore, multiple positioning technologies may be used, such as using a local positioning technology such as Bluetooth for indoor use, and satellite-based positioning systems such as GPS for outdoor use. In the case of Bluetooth, the location identifier may be in the form of the Bluetooth device ID, which is transmitted via the transmitter 414 as shown via wireless signal path 416. The transmitter 414 may be a separate transmitter component, or may be part of an integrated device such as a transceiver.

In accordance with another embodiment, the profile point 400 need not receive a profile point query. Rather, the profile point 400 continuously, periodically, or otherwise transmits its profile point identifier. The profile agent within the mobile device can monitor for such transmitted profile point identifiers. However, such an embodiment would consume more power at the profile point 400, which may not be desirable where the profile point is battery powered. Those skilled in the art will recognize from the description provided herein that other implementations of the profile point 400 are equally applicable in connection with the present invention.

Figure 5:
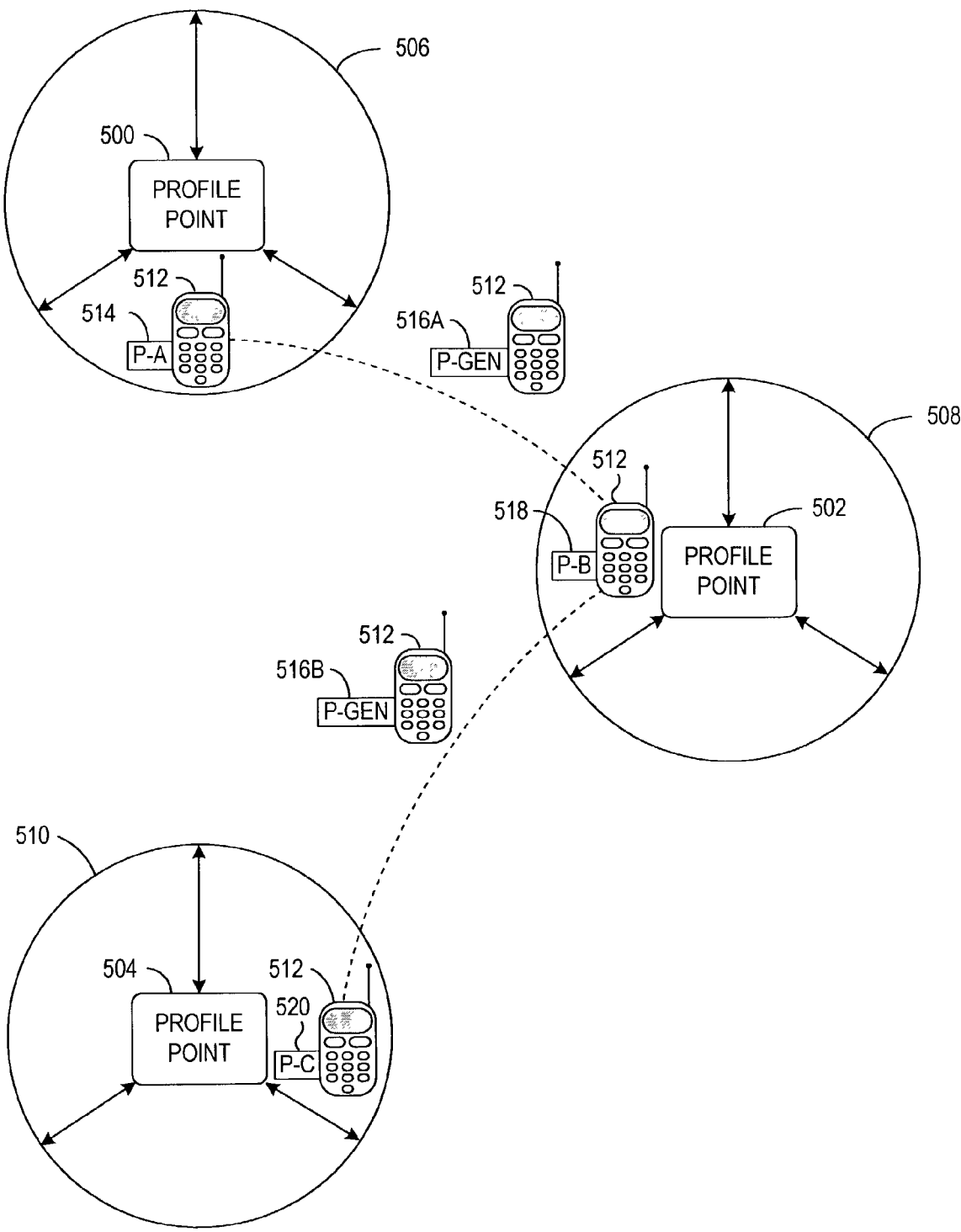
FIG. 5 depicts an exemplary progression of automatic profile selections based on the location of a mobile device, where a general/default profile is used in addition to profile points to automatically select the appropriate profile.

As previously indicated, the profile agent may be configured to make use of network location identifiers in addition to the profile point identifier. For example, in the context of GSM networks, these network location identifiers may include the cell-ID and LAC, or other network location identifiers. In a cellular environment, each cell is identified uniquely on the radio channel as belonging to a location area (LA), and each mobile device can determine its current location. The cell-ID and LAC may be used to switch the profile back to a predetermined or "general" profile if and when the user enters a radio cell area with a new cell-ID and LAC and thus leaves the known location. In this manner, a default profile can be automatically reset when the user has left a particular location associated with a particular cell-ID and LAC. FIG. 5 depicts an exemplary progression of automatic profile selections based on the location of a mobile device, where such a general profile is used in addition to profile points to automatically select the appropriate profile.

Referring to FIG. 5, any number of profile points 500, 502, 504 may be provided at various locations. Each profile point 500, 502, 504 has a particular range associated with its signal, represented by signal range boundaries 506, 508, 510 respectively. When a mobile device 512 is within a first signal range boundary 506 served by profile point 500, a first profile P-A 514 may be automatically selected in accordance with the present invention. When the mobile device 512 leaves the area associated with the signal range boundary 506, the mobile device 512 can automatically select a predetermined/general profile, depicted as profile P-GEN 516A. This can be effected in a number of manners. For example, the mobile device 512 can sense the signal generated by the profile point 500, and when the signal falls below a predetermined threshold, the P-GEN 516A profile may be automatically selected. In another embodiment as described above, the profile agent may associate the current cell-ID and LAC with the profile selected while the mobile device was within the signal range 506. Upon leaving the geographic area such that the cell-ID and/or LAC changes, the mobile device will be presented with a new cell-ID and/or LAC from the appropriate base station, which can be used to trigger automatic selection of the P-GEN 516A profile.

When the mobile device enters the signal range 508 of another profile point 502, the profile can again be changed. In the illustrated example, the profile is changed to P-B 518 upon coming within the range 508 of the profile point 502. Again, where the user leaves that area, the mobile device 512 can again automatically switch to the P-GEN profile 516B. The mobile device user can subsequently enter the range 510 of profile point 504 to automatically switch to profile P-C 520. As can be seen, this can continue indefinitely, allowing automatic profile selection wherever the user of the mobile device 512 chooses to go.

It should also be noted that any one or more of the ranges 506, 508, 510, etc. may be adjacent, where no automatic selection of the general profile occurs. Rather, in this instance, the profiles simply change when a signal from an adjacent profile point is sensed. These ranges may even overlap, and various techniques may be used to select the appropriate profile, such as by selecting the profile corresponding to the strongest profile point signal of the overlapping signals. In yet another embodiment, general/default profiles may not be used at all. In such an embodiment, the automatically selected profile corresponding to a particular profile point will remain selected until the mobile device enters the range of another profile point, or the mobile device user manually changes the profile.

In one embodiment of the invention, the profile agent is implemented as a software application. The profile agent may be integrally implemented, or at least partially integrally implemented, with other mobile device software. For example, a mobile telephone has resident software to facilitate operation of the wireless functions, the user interface, etc. The profile agent may be at least in part integral to such software. The profile agent may also be a stand-alone application that may be selected from the mobile device user interface, such as via buttons, keys, graphical user-interface (GUI), voice commands, etc.

The profile agent may also be used to manage the profile settings of other applications in addition to the profile settings of the mobile device itself. For example, profile information associated with an application such as a Wireless Application Protocol (WAP) browser, mobile wallet, etc., can also be managed by a profile agent in accordance with the present invention. As a more particular example, a mobile wallet is an application developed by the assignee of the instant application, that facilitates online payments and other areas of mobile commerce. The wallet application enables users to conduct online transactions via a mobile browser, such as a WAP browser. This wallet application serves as a secure storage space in the mobile device that faciltates the safe storage of personal information, such as credit card numbers, within the mobile device for use in mobile transactions. Transactions may even be authenticated through digital signatures. The mobile wallet may be implemented as a password-protected file in a mobile device that may include, among other things, credit card, loyalty card, or other card details in a virtual form. When the user wants to provide information protected by the mobile wallet, the user may simply open the mobile wallet to provide the information. In one embodiment, the wallet application includes various modules, including cards, personal notes, and settings. The "settings" may be configured as profiles, and may be automatically/interactively selected in accordance with the principles of the present invention.

The mobile wallet described above is merely one example of an application that may include settings or profiles in which the principles of the present invention are applicable. Any applications operable on the mobile device that include such settings or profiles are candidates for automatic profile selection in accordance with the present invention. As additional examples, a mobile browser such as a WAP browser also includes a number of selectable settings/profiles. Multimedia Messaging Service (MMS) applications also include settings/profiles. Thus, it should be recognized that the present invention is applicable to settings and profiles associated with the mobile device itself, as well as any application operating on the mobile device that may be configured via settings and/or profile selection.

As previously indicated, the profile agent will activate a profile when the mobile device is within an area of a "registered" profile point. The profile agent will cause the profile to be switched to a new profile where the mobile device moves into the area of a registered profile point. In addition, the profile agent may switch the profile to a general or default profile when the mobile device leaves the known location defined by, for example, a cell-ID and LAC. An example of a representative registration process is described in connection with FIG. 6 below.

FIG. 6, including FIGS. 6A–6E, illustrates a representative user interface that presents visual displays and facilitates graphical input, whereby profile points may be registered and affiliated with the desired profile characteristics. In this representative example, a GUI is used as the user interface mechanism. However, it will be apparent to those skilled in the art from the description provided herein that the user interface may be any user interface, including the use of one or more predefined buttons, user-defined macro buttons, voice/sound commands, a trackball, a mouse, touch screen, text entry, or any other known user-input mechanism or combination thereof.

A first display screen 600A shown in FIG. 6A illustrates an example of one manner in which a user of a mobile device can designate a particular profile. The representative profiles displayed include a general profile 602, silent profile 604, meeting profile 606, outdoor profile 608, private profile 610, and an automatic profile 612. The user can select any of these (or other) profiles. For example, selection of the general profile 602 selects a default profile, such as a profile that includes standard profile settings. Standard profile settings may include, for example, a standard ring volume, no call filtering, etc. Selection of the silent profile 604 may be used to reduce or eliminate ring volume. The silent profile 604 may optionally to identify actions such as incoming calls by way of visual indication, vibration, etc. The meeting profile 606 may also reduce or eliminate ring volume and/or identify calls visually or via vibration, and may also filter calls to only allow certain business calls to be passed through to the mobile device. The outdoor profile 608 may be used to increase ring volume, change the ring tone, etc. to account for characteristics such as higher surrounding noise. The various profiles described in connection with FIG. 6A are merely representative, as any features may be associated with any desired profile label.

Designation of the automatic profile 612 allows for automatic profile selection in accordance with the present invention. A cursor or other highlighting tool can be moved to highlight the automatic profile 612 label. Selection of the automatic profile 612 can be accomplished in any known manner, such as by activating a "select" icon 614. Selection of the automatic profile 612 presents display screen 600B in one embodiment of the invention. Display screen 600B presents one or more options associated with configuring the automatic profile selection in accordance with the present invention. In the illustrated embodiment, the various configuration options include switch automatic 620, switch interactive 622, register new location 624, update location 626, view locations 628, and delete location 630. Selection of the switch automatic option 620 configures the profile agent to automatically switch profiles depending on the location and profile points available. Similarly, the switch interactive option 622 configures the profile agent to automatically initiate interactive profile switching from which the user can be triggered to assist in one or more particular profile switching decisions.

As previously indicated, profile points are registered in order that the profile agent knows which locations/profile points are intended to cause automatic or interactive switching in accordance with the invention. The registration process may be initiated by selecting the register new location option 624. This can be initiated, for example, by highlighting the register new location option 624 and choosing the select icon 632. Where the mobile device is located within the range of a profile point, and the user selects the register new location option 624, that profile point can thus become associated with a particular profile. If the mobile device is within the range of the profile point upon selection of the register new location option 624, in indication to that effect can be provided via the mobile device display as shown in FIG. 6C. The display screen 600C of FIG. 6C may provide a visual indication (and/or other indication such as audio indication) that a new profile point has been registered. Because identifiers are provided by the profile point as previously described in connection with FIG. 2, the profile agent of the mobile device will be in possession of an identifier, such as a Bluetooth ID where the profile point implements Bluetooth technology. This can be seen on the representative display screen 600D of FIG. 6D, where the profile point identifier (PP ID) 640 may optionally be displayed.

At this point, the mobile device user may designate at least one profile to be associated with the newly registered profile point. In this example, a plurality of available profile options are presented via the mobile device from which the user can select at least one profile to be associated with that location. The representative profiles include a general profile 642, a silent profile 644, a meeting profile 646, an outdoor profile 648, and a private profile 650. These profile selections may (but do not need be) analogous to the corresponding profile selections 602, 604, 606, 608, 610 described in connection with FIG. 6A. In the illustrated embodiment has highlighted the private profile 650, and upon designation of this profile such as by choosing the select icon 652, the private profile is now associated with the newly registered profile point. A confirmation that the new location has been saved may be presented to the user, such as shown in display screen 600E of FIG. 6E. At this point, the new location has been registered and associated with a particular profile, so that upon subsequent entry to that location (i.e., within range of the particular profile point) the private profile will automatically (or interactively) be selected. Any number of profile points may be registered in a similar fashion, limited only by the number of available profile points, and memory or other operational constraints of the mobile device.

Returning to FIG. 6B, the mobile device user may be provided with various options directed to the saved locations. The update location option 626 allows the user to update a particular saved location. For example, the profile point at a particular location may be changed or replaced such that it is associated with a new profile point identifier (PP ID). The user may simply select the update location option 626 when the profile point has been changed, thereby updating that location to be associated with the new PP ID, without having to reassign the associated profile or reconfigure other parameters associated with that location. The view locations option 628 allows the user to view or otherwise be presented with the locations or a subset of the locations that are currently registered with the mobile device. The delete location option 630 allows the user to delete one or more of the currently saved locations.

Additional or secondary parameters may also be used in addition to the location of the mobile device to automatically or interactively select profiles in accordance with the present invention. These secondary parameters may include, for example, the time of day, the calendar date (e.g., a holiday, birthday, anniversary, etc.), the day of the week (e.g., weekend versus workday), or other secondary parameter. For example, where it is a holiday or weekend, the user's automobile profile (selected using the automobile profile point) may be further modified to reject work-related phone calls when the user is in the automobile, where such work-related calls would otherwise be allowed. In such a case, the profile may result in an adjustment to the volume of the ring tone to accommodate the relatively noisy automobile environment, but the profile is further modified because it is a holiday or weekend.

As another example, when the user has moved the mobile device to a location such as the user's home, a home profile may be selected, such as a private profile that filters out business calls. However, secondary parameters may be used to further designate or change the selected profile. For example, when the home profile is selected, a "time" parameter may be used as a secondary parameter to automatically/interactively change the profile depending on the time of day when the user is home. More particularly, a first home profile may be automatically selected when the user is at home during work hours, and a second home profile may be automatically selected when the user enters the home after work hours. Still further time parameters may be used, such that a third home profile is automatically selected after a "do not disturb" time, such as a predefined time when the mobile device user expects to retire for the night.

Figure 7:
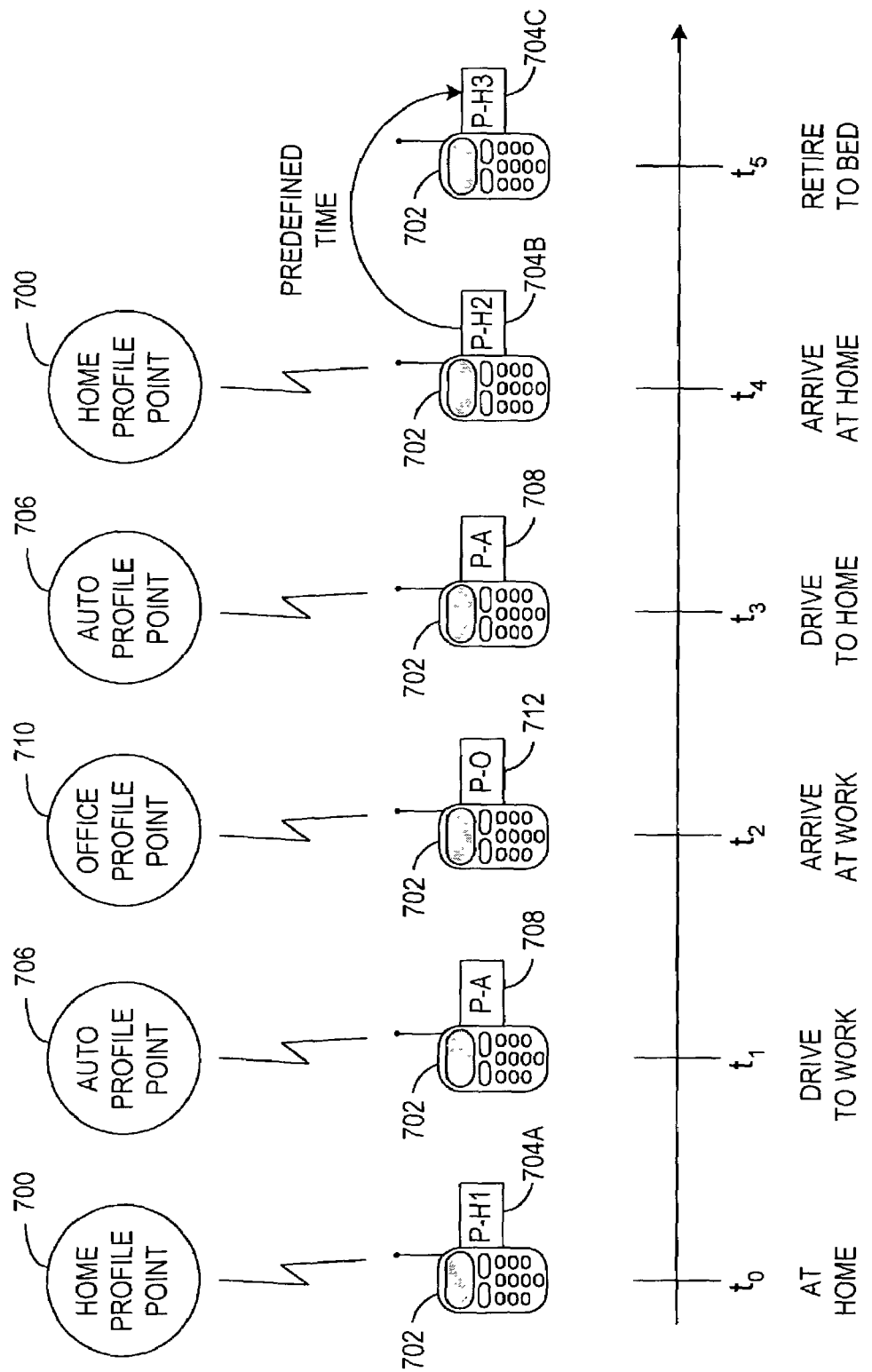
FIG. 7 illustrates one embodiment of the invention where the profile is automatically selected based on the location of the mobile device, and where the profile may be changed or altered based on secondary parameters.

FIG. 7 illustrates such an example, where the profile is automatically selected based on the location of the mobile device, and where the profile may be changed or altered based on secondary parameters. The secondary parameter associated with the example of FIG. 7 is a time parameter. The user may be at home at time $t_0$. A home profile point 700 automatically sets the profile of the mobile device 702 to a first home profile P-H1 704A. This profile may, for example, allow both personal and business calls to ring. While the home profile point 700 defines the primary profile to be used, the time of day may be used as a secondary parameter. In the morning before the user leaves for work, it may be acceptable to the user that business calls as well as personal calls are received. Where the mobile device maintains the current time, the current time may therefore be used as a secondary parameter to be used to automatically select an appropriate profile.

At time $t_1$, the user may drive to work, where an automobile profile point 706 is present causing automatic selection of the auto profile P-A 708. Upon reaching the office at time $t_2$, the office profile point 710 causes the office profile P-O 712 to be selected. After work, the user drives home at time $t_3$, where the automobile profile point 706 again selects the auto profile P-A 708.

When the user returns home at time $t_4$, the home profile point 700 can select the home profile. However, depending on the current time, a variation of the home profile or alternative home profile P-H2 704B may be automatically selected. This profile may differ from the P-H1 704A, for example, by filtering out business calls and only allowing receipt of personal calls. For example, the P-H2 704B may be selected when the mobile device is associated with the home profile point 700 and the time is after 5:00 p.m. This profile may be further modified at a different time, such as at time $t_5$ when the mobile device user expects to retire to bed for the night. At this user-defined time, yet another profile such as P-H3 704C may be automatically selected. This profile may differ from the P-H2 704B profile by providing filtering on the personal calls that could otherwise be received. For example, at time $t_5$, the P-H3 704C profile may filter all remaining personal calls except for anticipated emergency calls, such as from family members. Any number of secondary parameters may be used in connection with the present invention, and current time is one representative secondary parameter.

Figure 8:
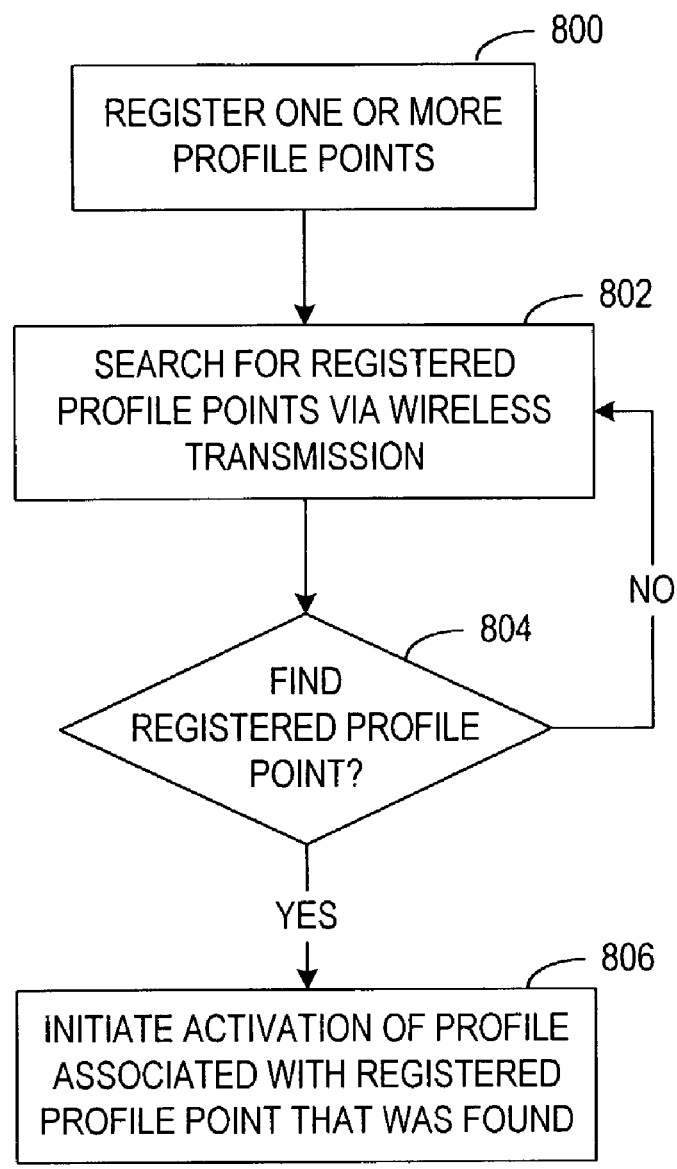
FIG. 8 is a flow diagram of one embodiment of a manner in which mobile device profiles are automatically updated, based on at least the location of the mobile device, in accordance with the principles of the present invention.

FIG. 8 is a flow diagram of one embodiment of a manner in which mobile device profiles are automatically updated, based on at least the location of the mobile device, in accordance with the principles of the present invention. One or more profile points are registered 800, so that entry of the mobile device into locations defined by the registered profile points can be determined. The profile agent searches 802 for registered profile points via a wireless transmission technology, including local positioning technologies such as Bluetooth, UWB radio, etc. In other embodiments where great precision is not required, even cellular technology may be used as the wireless transmission technology, where a cell base station serves as the profile point. If a registered profile point is found 804, activation of the profile associated with the registered profile point is initiated 806. In one embodiment of the invention, this profile activation initiation includes automatically changing the profile without user intervention. In another embodiment of the invention, the profile activation is initiated automatically, and the user may be prompted to select one or more profile options in response thereto.

Figure 9:
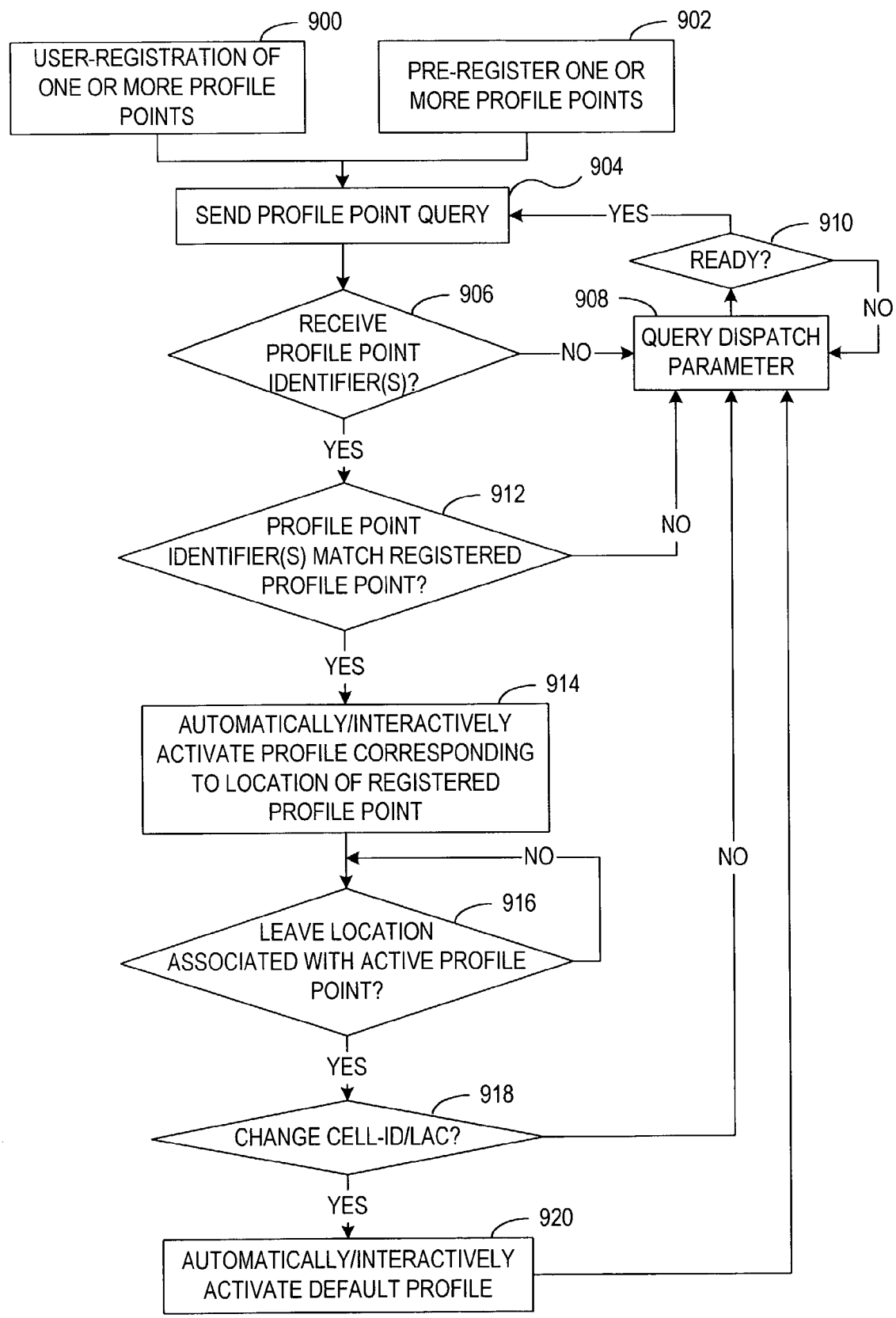
FIG. 9 illustrates another representative embodiment of a method for automatically updating mobile device profiles in accordance with the present invention.

FIG. 9 illustrates a more particular embodiment of a method for automatically updating mobile device profiles in accordance with the present invention. Registration of profile points may be effected in a number of ways, including user-registration 900. An example of such user-registration was described in connection with FIG. 6. Another example of registration of profile points is where one or more profile points are pre-registered 902 with the mobile device. For example, one or more pre-registered profile points may be supplied with a mobile device upon purchase of the mobile device, or equipped with a Subscriber Interface Module (SIM), Wireless Interface Module (WIM), smart card, or other memory device.

Profile point queries are sent 904 according to predetermined query dispatch parameters. For example, the predetermined query dispatch parameters may configure the profile agent to dispatch profile point queries periodically, upon the occurrence of predetermined triggering events, at specific times, etc. If the profile agent associated with the mobile device does not receive a profile point identifier(s) in response as determined at decision block 906, profile point queries will continue to be sent in accordance with the query dispatch parameters. More particularly, where the query dispatch parameter 908 is a predetermined time duration such that the profile point queries will be sent substantially periodically, it is determined 910 whether the predetermined time duration indicates that the profile agent is ready to dispatch another profile point query.

If the profile agent receives a profile point identifier in response to the profile point query as determined at decision block 906, it is determined 912 whether the profile point identifier matches a profile point that has been registered with the profile agent. If not, the profile is not updated, and the periodic dispatch of profile point queries can continue. However, the user may at such time opt to register the particular profile point and associated a profile with that location.

If the profile point identifier (PP ID) matches a registered profile point as determined at decision block 912, the profile corresponding to that location/profile point is automatically or interactively activated 914. For example, in one embodiment, a match of the PP ID and a registered profile point will automatically activate a profile associated with that registered profile point. As long as the mobile device stays at that location and does not leave as determined at decision block 916, the profile will remain unchanged, unless the user manually changes the profile. When the mobile device leaves that location associated with the active profile point as determined at decision block 916, a number of different actions may be taken, including taking no action until another profile point identifier is received by the profile agent. However, in the illustrated embodiment, it is determined 918 whether the user (and consequently the mobile device) have moved to a location where the cell-ID and LAC have changed. If not, continued dispatch of profile point queries occurs. If the cell-ID and LAC have changed, the profile may be automatically changed to a default profile, such as a "general" profile, as shown at block 920.

Using the description provided herein, the invention may be implemented as a machine, process, or article of manufacture by using standard programming and/or engineering techniques to produce programming software, firmware, hardware or any combination thereof.

Any resulting program(s), having computer-readable program code, may be embodied on one or more computer-usable media such as resident memory devices, smart cards or other removable memory devices, or transmitting devices, thereby making a computer program product or article of manufacture according to the invention. As such, the terms "article of manufacture" and "computer program product" as used herein are intended to encompass a computer program that exists permanently or temporarily on any computer-usable medium or in any transmitting medium which transmits such a program.

As indicated above, memory/storage devices include, but are not limited to, disks, optical disks, removable memory devices such as smart cards, SIMs, WIMs, semiconductor memories such as RAM, ROM, PROMS, etc. Transmitting mediums include, but are not limited to, transmissions via wireless/radio wave communication networks, satellite communication, etc. and which may ultimately be coupled to other networks such as other wireless networks, the Internet, intranets, telephone/modem-based network communication, hard-wired/cabled communication networks, etc.

From the description provided herein, those skilled in the art are readily able to combine software created as described with appropriate general purpose or special purpose computer hardware to create a mobile computer system and/or computer subcomponents embodying the invention, and to create a mobile computer system and/or computer subcomponents for carrying out the method of the invention.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method for activating profiles on a mobile device, comprising:
   facilitating storage of one or more profile point identifiers at the mobile device, wherein each of the stored profile point identifiers is associated with at least one of a plurality of profiles available on the mobile device;
   receiving a profile point identifier transmitted over-the-air (OTA) from a corresponding profile point via a local positioning technology using short range transmissions when the mobile device is within a transmission range of the profile point;
   activating at the mobile device the profile associated with the stored profile point identifier that matches the transmitted profile point; and
   configuring, using the activated profile settings, an application that facilitates secure storage of personal information used for making online payments via the mobile device.

2. The method of claim 1, further comprising comparing the transmitted profile point identifier to the stored profile point identifiers to determine whether the transmitted profile point identifier matches any of the stored profile point identifiers.

3. The method of claim 1, further comprising:
   transmitting at least one profile query from the mobile device; and
   receiving the profile query at a profile point, and transmitting the corresponding profile point identifier in response thereto.

4. The method of claim 3, wherein transmitting at least one profile query comprises transmitting a plurality of the profile queries according to predefined query dispatch parameters.

5. The method of claim 4, wherein the predefined query dispatch parameters comprise a time duration, and wherein transmitting a plurality of the profile queries comprises substantially periodically transmitting the profile queries upon each expiration of the time duration.

6. The method of claim 1, further comprising:
   repeatedly transmitting the profile point identifier from the corresponding profile point; and
   receiving the transmitted profile point identifier from the corresponding profile point when the mobile device is within the transmission range of the corresponding profile point, and comparing the transmitted profile point identifier to the stored profile point identifiers to determine whether the transmitted profile point identifier matches any of the stored profile point identifiers.

7. The method of claim 1, wherein facilitating storage of one or more profile point identifiers comprises:
   presenting a user interface to allow a user of the mobile device to register one or more of the profile points;
   associating at least one profile selected by the user of the mobile device with each of the profile points to be registered by the user; and
   storing the association of the selected profiles and corresponding registered profile points.

8. The method of claim 7, further comprising registering, by the user via the mobile device, one or more of the profile points, wherein registering comprises:
   activating a registration feature via the mobile device when the mobile device is within a transmission range of the profile point to be registered; and
   selecting the at least one profile to be associated with the registered profile point.

9. The method of claim 1, wherein facilitating storage of one or more profile point identifiers comprises providing memory on which the one or more profile point identifiers and associated profiles are pre-stored.

10. The method of claim 1, wherein transmitting the profile point identifier OTA from the corresponding profile point via a local positioning technology comprises transmitting the profile point identifier OTA from the corresponding profile point via one of Bluetooth technology and ultrawideband (UWB) radio technology.

11. The method of claim 1, further comprising transmitting another profile point identifier OTA from its corresponding profile point via a satellite-based positioning system.

12. The method of claim 1, further comprising transmitting another profile point identifier OTA from its corresponding profile point via a telecommunications network-based positioning system.

13. The method of claim 12, wherein transmitting another profile point identifier OTA from its corresponding profile point via a telecommunications network-based positioning system comprises transmitting the other profile point identifier OTA from at least one base station via a cellular network.

14. The method of claim 1, wherein activating the profile comprises automatically activating the profile without user intervention.

15. The method of claim 1, wherein activating the profile comprises automatically initiating profile activation, and interactively activating the profile with at least some user intervention.

16. The method of claim 1, further comprising reverting to a predetermined one of the plurality of profiles available on the mobile device when the mobile device is no longer within the transmission range of the profile point.

17. The method of claim 16, wherein reverting to the predetermined one of the plurality of profiles comprises reverting to the predetermined one of the plurality of profiles when an OTA signal from the corresponding profile point falls below a threshold.

18. The method of claim 1, further comprising reverting to a predetermined one of the plurality of profiles available on the mobile device when one or more predetermined location identifiers available to the mobile device indicate a change of location.

19. The method of claim 18, wherein reverting to a predetermined one of the plurality of profiles comprises reverting to the predetermined one of the plurality of profiles when one or more network-based identifiers provided over a wireless network to the mobile device change, thereby indicating a change of location of the mobile device.

20. The method of claim 19, wherein the one or more network-based identifiers comprise one or more of a cell identifier (cell-ID) and a Location Area Code (LAC).

21. A method for activating profiles on a mobile device based on a location of the mobile device, comprising:

storing one or more location identifiers on the mobile device, wherein the location identifiers correspond to locations in which automatic profile activation is desired;

moving the mobile device to one of the locations in which automatic profile activation is desired;

receiving at the mobile device an over-the-air (OTA)-transmitted location identifier via a local positioning technology using short range transmissions, the location identifier corresponding to the location in which the mobile device has been moved;

comparing the OTA-transmitted location identifier with the stored location identifiers on the mobile device to identify the stored location identifier matching the OTA-transmitted location identifier;

automatically activating one of the profiles available on the mobile device that was pre-assigned to the stored location identifier that matches the OTA-transmitted location identifier; and configuring, using the activated profile settings, an application that facilitates secure storage of personal information used for making online payments via the mobile device.

22. The method of claim 21, further comprising registering the locations in which automatic profile activation is desired, and wherein storing one or more location identifiers on the mobile device comprises storing the location identifiers corresponding to the registered locations.

23. The method of claim 22, further comprising assigning one of the profiles available on the mobile device to each of the registered locations.

24. The method of claim 22, wherein registering the locations comprises moving the mobile device to the locations in which automatic profile activation is desired, storing the location identifiers at those locations in which automatic profile activation is desired, and assigning at least one of the profiles available on the mobile device to each of the stored location identifiers.

25. The method of claim 21, further comprising forwarding the OTA-transmitted location identifier from the mobile device to a wireless network in which the mobile device operates therein, for use in other location-based services.

26. The method of claim 21, wherein receiving an OTA-transmitted location identifier comprises receiving a Bluetooth identifier transmitted via Bluetooth technology.

27. The method of claim 21, further comprising automatically activating a default profile available on the mobile device when the mobile device departs from the location.

28. The method of claim 21, wherein automatically activating one of the profiles comprises activating the profiles without user intervention.

29. The method of claim 21, wherein automatically activating one of the profiles comprises automatically initiating profile activation, and facilitating user interaction in response to the automatically initiated profile activation.

30. A mobile device having a plurality of features, and having a plurality of profiles each associated with one or more of the features, the mobile device comprising:

a memory to store one or more location identifiers, and to store an association between each of the stored location identifiers and one of the plurality of profiles;

a receiver to receive location identifiers transmitted over-the-air (OTA) via a local positioning technology using short range transmissions from respective profile points;

a processing system configured to determine whether the received location identifier matches any of the stored location identifiers, and to activate the profile associated with the stored location identifier that matches the received location identifier, whereby the features associated with the activated profile are placed into effect; and a mobile wallet application that facilitates secure storage of personal information used for making online payments via the mobile device, wherein the mobile wallet application is configured based on the features associated with the activated profile in response to the activation of the activated profile.

31. The mobile device as in claim 30, further comprising a transmitter to transmit profile point queries to search for the profile points, wherein the receiver receives the location identifiers OTA from the respective profile points in response to the respective profile point receiving at least one of the profile point queries.

32. The mobile device as in claim 30, wherein:
the memory further stores a profile agent; and
the processing system executes the profile agent to determine whether the received location identifier matches any of the stored location identifiers, and to activate the profile associated with the stored location identifier that matches the received location identifier.

33. The mobile device as in claim 32, wherein the profile agent comprises a program at least partially integral to mobile device software for operating the mobile device.

34. The mobile device as in claim 32, wherein the profile agent is a stand-alone software application initiated via mobile device software for operating the mobile device.

35. The mobile device as in claim 34, wherein the stand-alone software application is also used to manage profile settings of software applications operable on the mobile device.

36. The mobile device as in claim 35, wherein the software applications operable on the mobile device include at least one of a Wireless Application Protocol (WAP) browser and a Multimedia Messaging Service (MMS) application.

37. The mobile device as in claim 30, further comprising a user interface to facilitate registration of profile points, and wherein the processing system is further configured to store the one or more location identifiers resulting from the registration of the profile points into the memory.

38. A system for activating profiles on a mobile device based on a location of the mobile device, comprising:

(a) one or more profile points positioned at different locations in which automatic profile activation is desired, wherein each of the profile points at different locations is associated with a profile point identifier that is transmitted over-the-air (OTA) from the respective profile point using a local positioning technology that uses short range transmissions;

(b) a mobile device having a plurality of features, and having a plurality of profiles each associated with one or more of the features, the mobile device comprising:

(i) a memory to store one or more profile point identifiers, and to store an association between each of the stored profile point identifiers and one of the plurality of profiles;

(ii) a receiver to receive the profile point identifier transmitted from a respective one of the profile points when the mobile device is within a transmission range of the respective one of the profile points; and (iii) a processing system configured to determine whether the received profile point identifier matches any of the stored profile point identifiers, and to activate the profile associated with the stored profile point identifier that matches the received profile point identifier, and configuring, using the activated profile settings, an application of the mobile device that facilitates secure storage of personal information used for making online payments via the mobile device.

39. The system of claim 38, wherein the mobile device further comprises a transmitter to transmit profile point queries to search for the profile points, wherein the receiver receives the profile point identifiers OTA from the respective profile points in response to the respective profile point receiving at least one of the profile point queries.

40. The system of claim 39, wherein the profile point comprises:
- a profile point receiver to receive the profile point queries when the profile point queries are perceivable at the profile point; and
- a transmitter to transmit the respective profile point identifier OTA in response thereto.

41. The system of claim 39, wherein the profile point comprises:
- a wake-up circuit to receive the transmitted profile point queries and to exit a stand-by mode in response thereto;
- a profile point receiver to receive the profile point queries when the stand-by mode has been exited; and
- a transmitter to transmit the respective profile point identifier OTA.

42. The system of claim 38, wherein the local positioning technology includes at least one of Bluetooth technology and ultrawideband (UWB) radio technology.

43. A computer-readable medium having instructions stored thereon and executable by a computing arrangement in a mobile device for activating profiles on the mobile device by performing steps comprising:

facilitating storage of one or more profile point identifiers at the mobile device, wherein each of the stored profile point identifiers is associated with at least one of a plurality of profiles available on the mobile device;

receiving a profile point identifier transmitted over-the-air (OTA) using a local positioning technology that uses short range transmissions from a corresponding profile point when the mobile device is within a transmission range of the profile point;

activating the profile associated with the stored profile point identifier that matches the transmitted profile point; and configuring, using the activated profile settings, an application that facilitates secure storage of personal information used for online payments made via the mobile device.

* * * * *